US012649533B2

(12) United States Patent
Van Heur et al.

(10) Patent No.: US 12,649,533 B2
(45) Date of Patent: Jun. 9, 2026

(54) LOCKING ASSEMBLY FOR A BICYCLE RACK ASSEMBLY, LOCKING SYSTEM, BICYCLE RACK ASSEMBLY, KEY DEVICE, AND METHOD OF UNLOCKING

(71) Applicant: Invented Here B.V., Ulft (NL)

(72) Inventors: Roel Johannes Oda Van Heur, Ulft (NL); Marthijn Marinus Gerardus Henrikus Van Balveren, Ulft (NL)

(73) Assignee: Invented Here B.V., Ulft (NL)

( * ) Notice: Subject to any disclaimer, the term of this patent is extended or adjusted under 35 U.S.C. 154(b) by 35 days.

(21) Appl. No.: 18/688,095

(22) PCT Filed: Jul. 12, 2022

(86) PCT No.: PCT/NL2022/050407
§ 371 (c)(1),
(2) Date: Feb. 29, 2024

(87) PCT Pub. No.: WO2023/033645
PCT Pub. Date: Mar. 9, 2023

(65) Prior Publication Data
US 2024/0375739 A1 Nov. 14, 2024

(30) Foreign Application Priority Data
Aug. 30, 2021 (NL) ..................................... 2029078

(51) Int. Cl.
B62J 9/27 (2020.01)
B62J 7/04 (2006.01)
E05B 35/00 (2006.01)

(52) U.S. Cl.
CPC . B62J 9/27 (2020.02); B62J 7/04 (2013.01); E05B 35/00 (2013.01)

(58) Field of Classification Search
CPC ................ E05B 35/00; B62J 9/27; B62J 7/04
(Continued)

(56) References Cited

U.S. PATENT DOCUMENTS 4,030,648 A * 6/1977 Johnson ..................... B62J 7/04
D6/333
5,575,443 A * 11/1996 Honeycutt ................. B62J 7/08
248/314
(Continued)

FOREIGN PATENT DOCUMENTS

DE 433233 C 8/1926
EP 3351466 A1 * 7/2018 ............... B62J 9/20
(Continued)

OTHER PUBLICATIONS

WO-2012020639-A1; Anzai, Tadashi (Year: 2012).*
(Continued)

*Primary Examiner* — Nathan Cumar
(74) *Attorney, Agent, or Firm* — Banner & Witcoff, Ltd.

(57) ABSTRACT

Locking assembly for a bicycle rack assembly which comprises a rack-side unit and a base which is mountable to the rack-side unit, the locking assembly comprising a movable member configured to be retained by the base, the movable member comprising a base-side lock structure which is engageable with a rack-side lock structure of the rack-side unit for locking the base to the rack-side unit, wherein the movable member comprises an insertion recess configured for at least partly receiving a corresponding key device therein in an insertion direction for disengagement of the base-side lock structure from the rack-side lock structure, wherein the locking assembly, in particular the movable member, is provided with a security mechanism configured to inhibit disengagement of the base-side lock structure from the rack-side lock structure otherwise than by use of the corresponding key device.

18 Claims, 12 Drawing Sheets

(58) Field of Classification Search
    USPC ........................................................ 70/233
    See application file for complete search history.

(56)                    References Cited

U.S. PATENT DOCUMENTS

|  |  |  |  |  |
|---|---|---|---|---|
| 6,817,501 B1 * | 11/2004 | Rogers | ........................ | B62J 7/04 |
|  |  |  |  | 224/431 |
| 10,563,429 B1 * | 2/2020 | Bailey | ................... | E05B 35/008 |
| 11,654,993 B1 * | 5/2023 | Reap | ........................ | B62J 11/00 |
|  |  |  |  | 224/427 |
| 2016/0214669 A1 * | 7/2016 | Ton | ............................ | B62J 9/30 |
| 2021/0122436 A1 * | 4/2021 | Summers | ................. | B62J 6/055 |
| 2023/0111464 A1 * | 4/2023 | Dalan | ........................ | B62J 7/08 |
|  |  |  |  | 224/412 |

FOREIGN PATENT DOCUMENTS

| EP | 3351466 B1 | 3/2020 |
|---|---|---|
| NL | 1021436 | 9/2002 |
| WO | 2012020639 A1 | 2/2012 |

OTHER PUBLICATIONS

WO-2006097738-A2; Brophy Edward Francis (Year: 2006).*
NL-2018834-B1; Ghassan Alagourie (Year: 2018).*
NL-1021436-C2; Mijnen Wilfried Hendrikus Mar (Year: 2003).*
EP-4306395-A1; Thiemann Volker (Year: 2024).*
DE-202011000350-U1; Comus internatioanl (Year: 2011).*

* cited by examiner

41*

415   412

50

59

54

54

54

414*

54

54

50

54

411

ID

43*

61

55

62

56

57  57  60

58

57

57

57

57

57

ID

41*

414*b

41*

414*c

414*a

41*

41*

414*d

414*e

414*f

41*

41*

414*g

41*

414*h 50 54 54 54 50

41*

53

53

54

414*i 54 54

58a

58b

58e

58c

58d

58f

58g

58h

58i 57 57 57 57

57

56

LOCKING ASSEMBLY FOR A BICYCLE RACK ASSEMBLY, LOCKING SYSTEM, BICYCLE RACK ASSEMBLY, KEY DEVICE, AND METHOD OF UNLOCKING

RELATED APPLICATIONS

This application is a U.S. National Stage Application of International Application No. PCT/NL2022/050407, filed on Jul. 12, 2022, which claims the benefit of International Application No. NL 2029078, filed on Aug. 30, 2021, each of which are incorporated herein by reference in their entireties.

FIELD

The invention relates to a locking assembly for a bicycle rack assembly which comprises a rack-side unit and a base which is mountable to the rack-side unit. The invention also relates to: a locking system, a bicycle rack assembly, a key device, and a method of unlocking a base from a rack-side unit.

BACKGROUND

Bicycle rack assemblies are known. For example, EP3351466B1 discloses a bicycle rack assembly comprising a rack as a rack-side unit and a base which is selectively mountable to the rack. The base can be fixedly connected to e.g. a basket or a bag, so that such a basket or bag can be releasably mounted to the rack via the base. A user can release the base, and with that the basket or bag, from the rack, for example to take the basket or bag with them while leaving the bicycle with the rack behind. Upon return to the bicycle, the user can remount the base to the rack, all while the basket or bag can continue to be functional, e.g. holding items to be carried therein.

The bicycle rack assembly of EP3351466B1 comprises a movable member slideably retained in a side recess of the base, the movable member comprising a tongue which is engageable with a snap recess of the rack for locking the base to the rack. The movable member comprises an insertion recess configured for at least partly receiving an unlock unit therein in an insertion direction. Disengagement of the tongue from the snap recess is then possible by pushing the inserted unlock unit against a biasing of the movable member, causing a disengaging movement of the movable member. Such a disengaging movement effectively unlocks the base from the rack, so that the user can subsequently release, e.g. tilt and lift, the base away from the rack.

While the bicycle rack assembly of EP3351466B1 has many advantages over other known bicycle rack assemblies, including high versatility and ease of use, it is hypothesized that further improvements could still be possible, in particular as needs and preferences of users evolve.

SUMMARY

An object is to provide one or more improvements in the field of bicycle rack assemblies, for example in a bicycle rack assembly of the type as disclosed in EP3351466B1 or a related bicycle rack assembly. An object is to at least partly address one or more unmet needs of users or potential users of such bicycle rack assemblies. An object is to at least provide an alternative to a known bicycle rack assembly or one or more parts thereof.

An aspect of the invention provides a locking assembly according to claim 1 for a bicycle rack assembly which comprises a rack-side unit and a base which is mountable to the rack-side unit. In the present context a rack-side unit may be or comprise e.g. a bicycle rack itself and/or an add-on unit which is fixedly mountable to a bicycle rack.

The locking assembly comprises a movable member configured to be retained by the base, the movable member comprising a base-side lock structure, e.g. a tongue, which is engageable with a rack-side lock structure, e.g. a snap recess, of the rack-side unit for locking the base to the rack-side unit. The movable member comprises an insertion recess configured for at least partly receiving a corresponding key device therein in an insertion direction for disengagement of the base-side lock structure from the rack-side lock structure.

The locking assembly, in particular the movable member, is provided with a security mechanism configured to inhibit disengagement of the base-side lock structure from the rack-side lock structure otherwise than by use of the corresponding key device.

It has been found that a problem associated with the known bicycle rack assembly is that the tongue of its movable member can be disengaged from the snap recess of the rack relatively easily by unauthorized persons, for example using a screw driver, a pen, or even merely a finger to actuate the movable member. Subsequently, such an unauthorized person may steal the base with the basket or bag and its contents.

Thus, although some users may initially presume that the unlock device acts as a key, the known bicycle rack assembly actually lacks an associated security mechanism. Consequently, it has been found that the known bicycle rack assembly tends to provide insufficient security against theft, at least a lower level of security than is expected by users. Moreover, due to the unlock device being perceived as a key by some users, the known bicycle lock assembly can lead to a false sense of security.

The present invention may be regarded as a problem invention, at least in the sense that the acknowledgement of the above described problems contributes to the inventive nature of the invention.

To address these problems, the locking assembly according to the present invention is provided with a security mechanism which is configured to inhibit disengagement of the base-side lock structure from the rack-side lock structure otherwise than by use of a corresponding key device, wherein the key device may essentially take the place of the known unlock unit. Such a security mechanism and key device can be realized in various ways, as will be explained further herein. Advantageously, such a security mechanism and key device can provide a desired increased level of security while the versatility and usability of known bicycle rack assemblies can at the same time be maintained or even be improved.

Optionally, the security mechanism comprises at least one blocking element which at least partly extends within the insertion recess, so as to be movable between a blocking position and a releasing position by the key device when inserted into the insertion recess. In the blocking position, the at least one blocking element is configured to block a disengaging movement of the movable member with respect to the base. Such a disengaging movement is associated with, and preferably effects, disengagement of the base-side lock structure from the rack-side lock structure. In the releasing position, the at least one blocking element is configured to allow said disengaging movement.

Advantageously, such a blocking element can prevent that the movable member would be actuatable from outside the insertion recess, for example using a finger or other means positioned near an entrance of the insertion recess but not reaching into the insertion recess.

Preferably, the at least one blocking element is positioned away from, in particular spaced apart from, the entrance of the recess, so that the at least one blocking element is only actuatable by reaching relatively deep into the insertion recess.

Such a blocking element may for example be integrally formed with a main body of the movable member, e.g. by injection molding, or as a separately added element, e.g. formed out of a metal plate.

The base, in particular a side recess thereof in which the movable member is retained, may be configured to cooperate with the at least one blocking element for blocking the disengaging movement when the blocking element is in the blocking position, as will be explained further elsewhere in this description.

The security mechanism, e.g. the at least one blocking element, may be configured to convert an actuation by the key device in the insertion direction to a releasing movement of the at least one blocking element, i.e. a movement from the blocking position to the releasing position. The releasing movement may be directed substantially transversely with respect to the insertion direction. Accordingly, the at least one blocking element may comprise and/or be associated with an inclined engagement surface which is configured to convert a force exerted thereon in the insertion direction to a force in a different direction, in particular a transverse direction of the releasing movement.

The at least one blocking element is preferably biased towards the blocking position, for example by an elastic connecting portion by which the at least one blocking element may be connected to a main body of the movable member, or by a leaf spring which may be integrally formed with the blocking element. To enable disengagement of the base-side lock structure from the rack-side lock structure, the biasing can be overcome by the aforementioned actuation by the key device. In this way, the disengaging movement of the movable member with respect to the base is normally blocked so as to protect against unauthorized disengagement of the base from the rack-side unit, i.e. disengagement without use of the corresponding key device. The biasing is preferably sufficiently strong so as to prevent that it may be overcome by merely shaking the bicycle rack assembly, while it is sufficiently weak so as to allow it to be overcome by the actuation by the key device.

Optionally, the at least one blocking element comprises at least two blocking elements which are distributed across the insertion recess.

Such a multiple number of blocking elements can provide further enhanced security against unauthorized disengagement of the base-side lock structure from the rack-side lock structure, in particular since it can be more difficult to actuate such a multiple number of blocking elements simultaneously compared to only a single blocking element, without use of a corresponding key device. Meanwhile, with the corresponding key device, operation of such multiple blocking elements can essentially be as easy as operation of a single blocking element.

The at least two blocking elements may in particular be distributed in a direction transverse to the insertion direction. The at least two blocking elements may thus be mutually spaced apart when viewed in the insertion direction, in particular with mutual interspacing which is large compared to a corresponding dimension of a respective blocking element. For example, two blocking elements may be positioned at, e.g. adjacent, opposite sides of the insertion recess, e.g. opposite lateral sides.

In this way, simultaneous releasing actuation of the multiple blocking elements without use of the corresponding key device can be made even more difficult, thereby further enhancing security.

Optionally, the at least two blocking elements are interconnected at one or more positions along the insertion direction beyond where the key device extends when inserted into the insertion recess, in particular only at such one or more positions.

Thereby, the interspacing among the blocking elements can be well controlled, in particular without facilitating indirect operation of one of the blocking elements via another of the blocking elements, which could otherwise compromise security.

Optionally, the at least two blocking elements are each provided with a respective resilient arm formed as a leaf spring configured to provide the movability between the blocking position and the releasing position.

Such a resilient arm can provide said movability in a relatively simple and robust way, in particular while also providing preferential biasing towards the blocking position, as alluded to elsewhere herein.

Optionally, the leaf springs are each part of a same metal element which further comprises an interconnecting portion providing the interconnection of the at least two blocking elements, the interconnecting portion preferably being fixedly arranged with respect to the movable member.

Such a metal element enables the security mechanism to be relatively robust and precise, thereby further inhibiting unauthorized operation. The metal element is preferably a steel element, in particular being made from so called spring steel, e.g. from a folded or bent plate of spring steel. Alternatively, other metal materials, e.g. alloys, may be used. In an advantageous elaboration, the metal element may also form the blocking elements and/or respective inclined engagement surfaces, preferably formed from a same continuous piece of metal plate material along with the leaf springs and the interconnecting portion.

Optionally, the at least two blocking elements are spaced further apart in their releasing positions than in their blocking positions, in particular spaced further apart transverse to the insertion direction.

Thereby, the respective releasing directions of the blocking elements can be substantially opposite directions, which may additionally inhibit tampering efforts as well as providing a user-friendly centering effect on an inserted key device.

Optionally, the metal element is substantially U-shaped, in particular with the leaf springs as legs of the U-shape each extending from the interconnecting portion towards respective ones of the blocking elements and/or inclined engagement surfaces at their ends.

It has been found that such a shape can support the aforementioned functionalities of the metal element in a particularly effective and economical way. It shall be appreciated that the term U-shape as used herein merely refers to an overall general shape of the metal element and does not convey any detailed shape information. In this sense, a U-shaped metal element could also be called C-shaped, [-shaped (square bracket shaped) and/or Ω-shaped (omega-shaped). In fact, as will be explained further in the detailed description, the aforementioned ends of the U-shape may have details similar to those of an Ω-shape (omega-shape).

Alternatively or additionally to the aforementioned distribution of blocking elements transverse to the insertion direction, the at least one blocking element may comprise one or more series of blocking elements which are distributed along the insertion direction, for example one respective series on either lateral side of the insertion recess. Such a series may then, depending on positions, sizes and/or shapes of its blocking elements, define a key code which is to be matched by a structure, e.g. a teethed or ridged structure, of the key device along the insertion direction.

As a further alternative or additional option, the at least one blocking element may be operable by an eccentric cam which extends from an insertion end of the key device, wherein the key device is rotatable in the insertion recess about a central rotation axis substantially parallel to the insertion direction in dependence of a key code structure of the key device, e.g. a series of teeth or ridges having particular positions, sizes and/or shapes, matching a corresponding key code structure of the insertion recess, e.g. correspondingly positioned, sized and/or shaped recesses in a wall of the insertion recess which are configured to allow passage of the aforementioned teeth or ridges therethrough when the key device is rotated in the insertion recess.

Optionally, the security mechanism comprises at least one protrusion which extends into the insertion recess transverse to the insertion direction, thereby restricting access into the insertion recess in the insertion direction.

In particular, access into the insertion recess may thus be inhibited otherwise than by the corresponding key device, which may be shaped specifically to avoid, at least not be blocked by, the at least one protrusion upon insertion into the insertion recess, in particular while still being able to reach into one or more parts of the insertion recess which are relevant for operating the locking assembly.

The at least one protrusion, e.g. in the form of one or more teeth and/or one or more ridges, may be positioned at an entrance of the insertion recess and/or further inwards. Preferably, at least one or some of the protrusions are positioned at and/or extend up to the entrance of the insertion recess so as to make it more difficult to reach deep into the insertion recess without use of a corresponding key device.

Depending on their combined shapes, sizes and/or positions, the at least one protrusion may form a structure which defines a key code to be matched by a shape and/or size of the key device, in particular by a profile of an insertion end or insertion portion of the key device when viewed in the insertion direction. A range of key codes may thus be provided so that different individual locking assemblies may generally require a different corresponding key device, i.e. so that the key devices of different locking assemblies are not generally exchangeable. Nevertheless, the number of different key codes across a set of locking assemblies may be finite, in particular smaller than the total number of locking assemblies in the set. For example, nine, eighteen, or a different number of unique key codes may be represented in a set of locking assemblies.

By thus providing at least a relatively large number of unique key codes across a set of locking assemblies, it is made correspondingly less likely that an unauthorized person inadvertently has a key device available to them which is suitable for operating a particular version of the movable member.

Preferably, when viewed in the insertion direction, the at least one protrusion extends between the at least two blocking elements, at least between respective portions, e.g. inclined engagement surfaces, of the blocking elements which portions are configured to be engaged by the corresponding key device for thereby moving the blocking elements to their releasing positions.

Such a configuration can advantageously inhibit simultaneous engagement of the at least two blocking elements by insertion of a single non-concave structure, e.g. a head of a screw driver or a pen, into the insertion recess.

Optionally, the insertion recess comprises a retaining structure which is configured to be engaged by a retaining element of the key device for selectively retaining the key device in the insertion recess.

Such a retaining structure can advantageously prevent that the key device is unintentionally lost, e.g. by accidental removal from the insertion recess. In this respect, importantly, it has been found that users sometimes prefer to leave such a key device inserted in the insertion recess, in particular while they themselves can keep an eye on the bag or basket, for example when riding an associated bicycle, or when the bicycle with the bag or basket is stored in a secure environment. Meanwhile, loss of the key device, e.g. due to vibrations induced by cycling, would result in the user no longer being able to release the bag or basket from the bicycle rack. Thus, it has been found that such a solution for selectively retaining the key device in the insertion recess is desired. The retaining may be activated automatically, e.g. through a biasing, and may be deactivated by a user, e.g. using a handle of the key device, as will be explained further elsewhere in this description.

Optionally, the locking assembly further comprises and/or is combined with the base, wherein the movable member is retained by the base, for example in a side recess of the base. Said retaining by the base is in particular a moveable, e.g. slideable, retaining, so that the movable member is movable in the side recess along the insertion direction, at least when the movable member is operated using a corresponding key device.

Preferably, the base, e.g. a side recess thereof in which the movable member is retained, comprises at least one blocking structure which is configured to be engaged by the at least one blocking element of the movable member in the blocking position for blocking the disengaging movement of the movable member with respect to the base. As such, the blocking structure may be considered to form part of, at least cooperate with, the security mechanism.

The at least one blocking structure may for example comprise at least one abutment face against which the at least one blocking element abuts in the blocking position. The at least one abutment face may then face outwards from the insertion recess so as to enable blocking of inward movement, i.e. disengaging movement, of the movable member with respect to the insertion recess. The at least one blocking structure, e.g. the at least one abutment face, is preferably configured to allow passage of the at least one blocking element therebeyond, in particular inwards into the side recess, when the at least one blocking element is in the releasing position. In case of multiple blocking elements, each blocking element may be associated with a respective blocking structure, e.g. a respective abutment face. Alternatively, for example, a common, e.g. relatively large, blocking structure, e.g. abutment face, may be provided for multiple blocking elements.

The base and/or the movable member are preferably configured to limit play therebetween in one or more directions, in particular any rotational and/or translational play which if not so limited could be abused to move, in particular force, the blocking element beyond its blocking structure in the direction of the inward disengaging movement of the movable member without a corresponding key device. To that end, for example the side recess of the base and/or an exterior of the movable member may be provided with one or more suitable guiding structures, e.g. a ridge and/or a groove, which limit such play while still allowing the inward disengaging movement itself, at least when a corresponding key device is used.

The movable member is preferably biased towards engagement of the base-side lock structure with the rack-side lock structure, for example by a compression spring arranged between an end of the movable member and an end of the side recess in which the movable member is retained, i.e. similar to such a biasing in the known bicycle rack assembly. In that case, the same biasing preferably also promotes that the at least one blocking element of the movable member is normally positioned beyond or at the at least one blocking structure of the base so that the at least one blocking element and the at least one blocking structure normally block a movement of the movable member deeper into the side recess.

The security mechanism of the movable member may alternatively or additionally comprise a shield arranged on the base to at least partly cover an outward facing side of the movable member, the shield having an opening therein which substantially matches an entrance of the insertion recess of the movable member. Such a shield advantageously inhibits actuation of the movable member by a means which cannot be inserted into the insertion recess, e.g. a finger or a relatively thick instrument, in particular when the insertion recess and the opening have a relatively restricted shape, the opening for example being in the form of a slit. Such a shield provides a relatively simple way of enhancing security and can for example be applied relatively easily to existing bicycle rack assemblies, for example by screwing or gluing such a shield to the base of the existing bicycle rack assembly.

A further aspect provides a locking system for a bicycle rack assembly which comprises a rack-side unit, e.g. a bicycle rack and/or a unit which is fixedly mountable to a bicycle rack, and a base which is mountable to the rack-side unit, the locking system comprising a locking assembly as described herein and further comprising the corresponding key device.

Such a locking system provides above described advantages. In particular, the key device in combination with the security mechanism of the movable member enables easy disengagement of the base from the rack-side unit by a person who possesses the key device, while such disengagement is otherwise inhibited, thus providing a particularly secure locking system which is still versatile and easy to use.

Analogous to what is described herein with respect to the locking assembly itself, also the locking system may comprise and/or be combined with the base, wherein the movable member may be retained by the base.

Optionally, the key device comprises a retaining element which is movable between a retaining position and a releasing position, in particular with respect to a main body of the key device. In the retaining position, the retaining element is configured to engage the retaining structure of the insertion recess for thereby retaining the key device in the insertion recess. In the releasing position, the retaining element is configured to allow release of the key device from the insertion recess.

As alluded to above, such a retaining structure and retaining element can advantageously prevent that the key device is unintentionally lost from the insertion recess, while still being easy to remove by a user if and when so desired.

The retaining element may for example comprise a hook, wherein the retaining structure may comprise a retaining recess formed on a side of the insertion recess for retaining the hook therein when in the retaining position. The hook may be suspended from a main body of the key device in a resilient way so as to be biased into the retaining recess. The hook can then be provided with an inclined face so as to be deflected upon insertion of the key device into the insertion recess, wherein the normal position of the hook can be automatically restored by the aforementioned biasing upon engagement of the retaining recess. To disengage the hook from the retaining recess, the user may rotate the hook, for example about a rotation axis substantially parallel or transverse to the insertion direction. Thus, the hook can be released from the retaining recess by a deliberate user action, so that the retaining of the hook in the retaining recess and thereby the retaining of the key device in the insertion recess is selective.

Optionally, the key device comprises a handle coupled to the retaining element for manually moving the retaining element between the retaining position and the releasing position, in particular while the key device is received in the insertion recess.

Such a handle may for example be configured to facilitate the above described rotation of the hook out of the retaining recess. The handle may be arranged at or near an end of the key device opposite an insertion end which is configured to be inserted into the insertion recess. A shaft or arm which e.g. extends along the insertion direction, in particular through a main body of the key device, may couple the handle to the retaining element. The shaft or arm may be resilient so as to provide the aforementioned biasing of the retaining element towards the retaining recess.

The handle and/or the retaining element may be provided with a means to normally maintain the retaining element in the retaining position, in particular in the absence of actuation, e.g. of the handle, by a user. To that end, the handle and/or the retaining element may be biased towards the retaining position, and/or a small resistance to movement from either position may be provided, e.g. by a resisting structure of the key device, which resistance can be overcome by a user handling the key device.

Alternatively or additionally, the key device may comprise a retaining structure, for example a retaining recess in an insertable portion of the key device, while the movable member comprises a retaining element, for example a pen which is biased to automatically engage the retaining structure of the key device when the key device is in an operating position in the insertion recess. The key device may then comprise a moveable, e.g. slideable, element, preferably with a handle or knob, which is configured to allow a user to thereby selectively force the retaining element of the movable member out of engagement with the retaining structure of the key device, for example by closing off a recess which forms the retaining structure, thereby selectively enabling retraction of the key device from the insertion recess.

Optionally, the key device is changeable between an operational configuration, in which the key device is configured to operate the security mechanism, and a transport configuration, in which the key device is more compact compared to the operational configuration.

In this way, in the transport configuration, the key device can be easily carried by a user, e.g. together with one or more other key devices such as for a bicycle lock. Meanwhile, in the operational configuration, the key device can easily be inserted into the insertion recess, in particular while reaching some distance along, e.g. under, a bag or basket to which the base is fixed. In the transport configuration, an insertable end or insertable portion of the key device may be partly or fully covered, thus being protected from damage or wear. In the transport configuration, the key device may thus be less or not configured to operate the security mechanism, so that the user needs to change the key device back to the operational configuration in order to be able to unlock the base from the rack-side unit. The changeability between said configurations may be provided by the key device comprising at least two slideably connected portions or parts, for example one sliding inside another, preferably such that a user can select either configuration by sliding said portions with respect to each other. Alternatively or additionally, at least two pivotably and/or hingingly connected portions may be provided, among other possibilities. The key device is preferably configured, e.g. by means of a biasing element or a resistance structure, to normally maintain its selected configuration, i.e. either the transport configuration or the operational configuration, so that no user action is needed to maintain the key device in the selected configuration.

A further aspect provides a bicycle rack assembly comprising the rack-side unit, the base which is mountable to the rack-side unit, and a locking assembly as described herein. The locking assembly is preferably provided as part of a locking system and/or a combination as described herein. A movable member of the locking assembly is preferably arranged in a side recess of the base.

Such a bicycle rack assembly provides above mentioned advantages, in particular providing improved security without affecting ease of use.

As one possibility, the bicycle rack assembly may overall be configured essentially as disclosed in EP3351466B1, except for where differences and/or additions are indicated in the present disclosure. Where such differences and/or additions are indicated as optional herein, the corresponding part of the configuration as disclosed in EP3351466B1 may generally be maintained instead. Meanwhile, it will be appreciated that the present invention is not limited to bicycle rack assemblies of the type of EP3351466B1 and that various types of bicycle rack assemblies can benefit from the combination of improved security and high usability enabled by the present invention.

A further aspect provides the key device of the locking system as described herein.

As explained above, such a key device can advantageously enable a user to disengage the base from the rack-side unit of the bicycle rack assembly, while the bicycle rack assembly can be well secured against unauthorized disengagement.

A further aspect provides a method of unlocking a base from a rack-side unit in a bicycle rack assembly. The method comprises providing a bicycle rack assembly as described herein and the corresponding key device as described herein. The method comprises inserting the key device into the insertion recess, thereby operating the security mechanism of the movable member, and subsequently disengaging the base-side lock structure from the rack-side lock structure, thereby unlocking the base from the rack-side unit.

In this way, a user who has a corresponding key device can easily unlock the base from the rack-side unit, while the bicycle rack assembly advantageously provides an improved level of security.

DETAILED DESCRIPTION

In the following, the invention will be explained further using exemplary embodiments and drawings. The drawings are schematic and merely show examples. In the drawings, corresponding elements have been provided with corresponding reference signs. In the drawings, FIG. 1A shows an exploded perspective view of a bicycle rack assembly with a locking system known from EP3351466B1;

Figure 18:
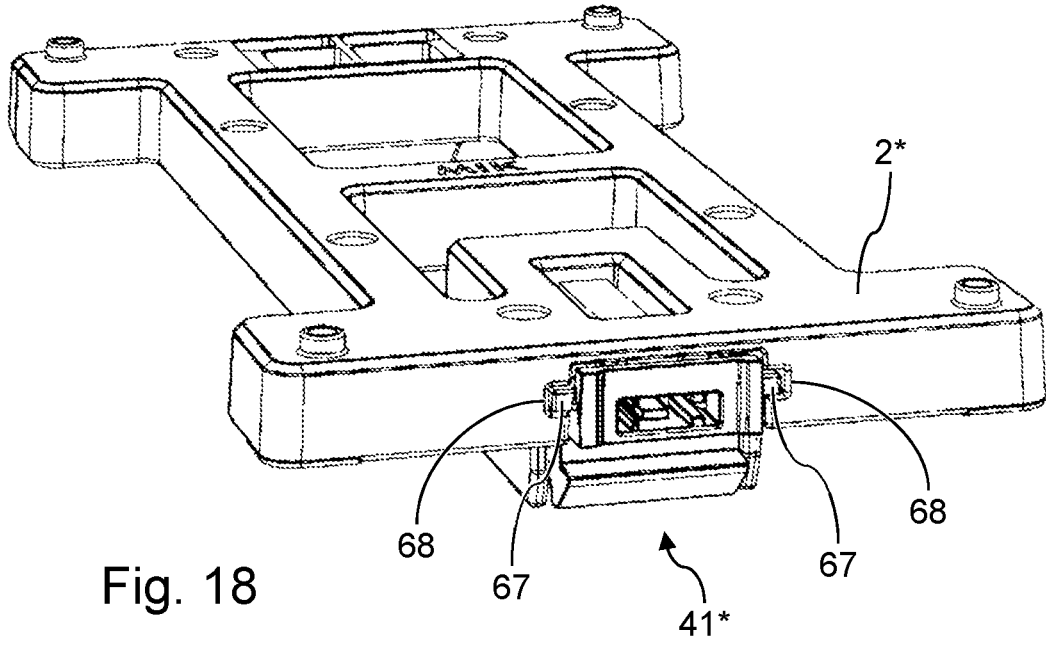
Figure 19:
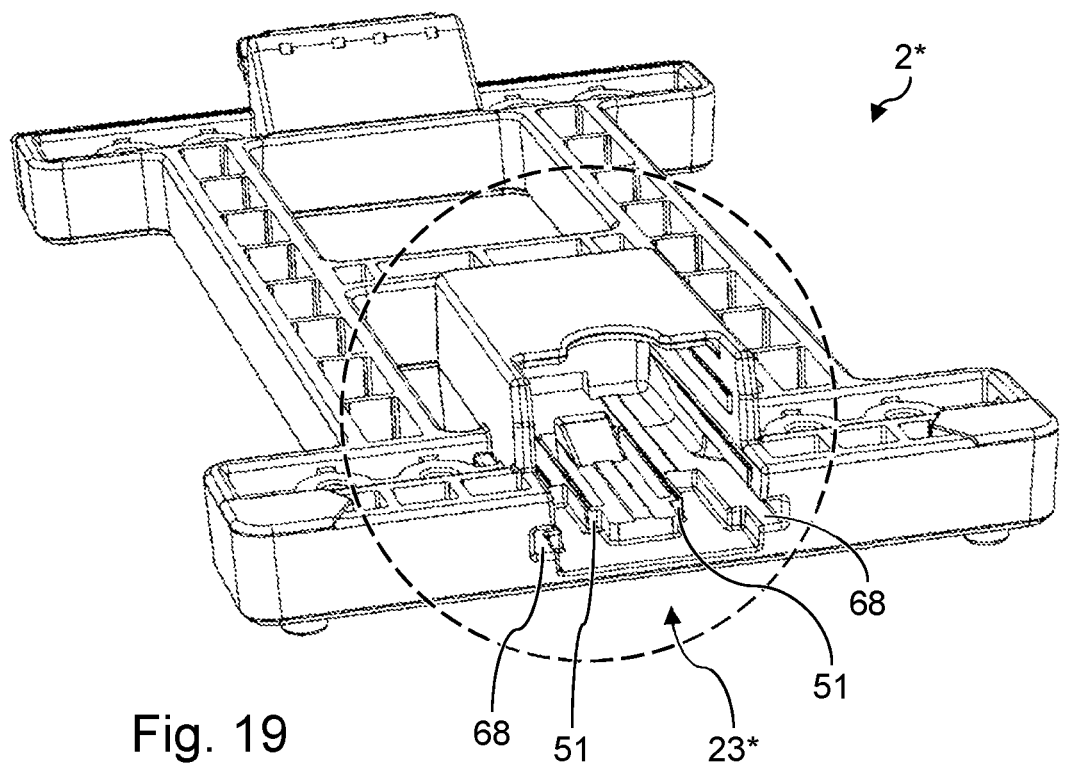
Figure 20:
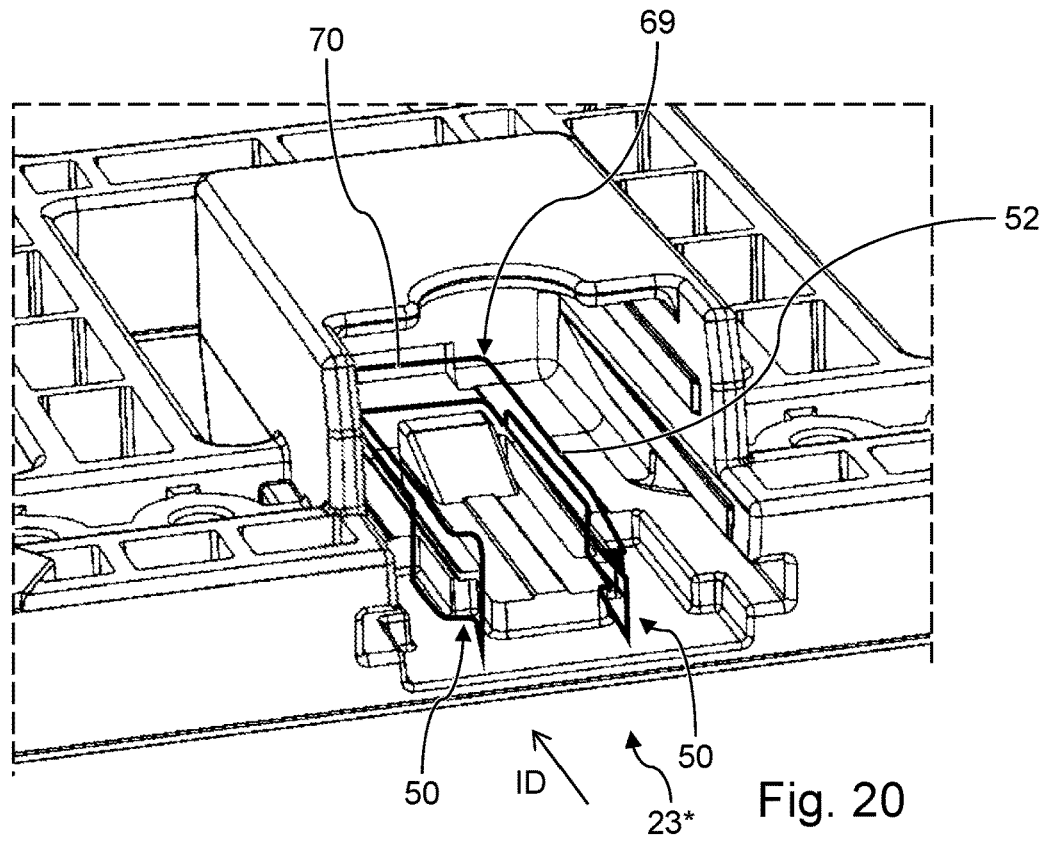
Figure 21:
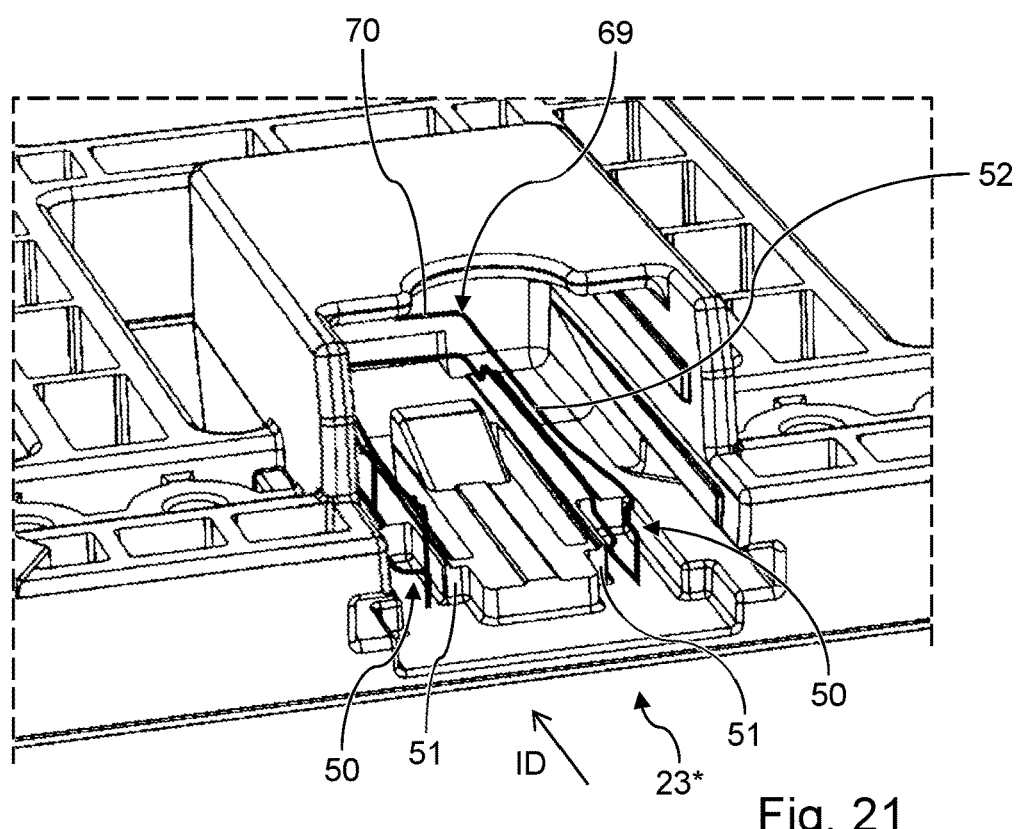

FIGS. 18 and 19 show perspective views of a further exemplary base, wherein in FIG. 18 the base is viewed partly from a top side and in FIG. 19 the base is viewed partly from a bottom side, wherein in FIG. 18 also an exemplary movable member is shown being retained by the base; and FIGS. 20 and 21 show a detail of FIG. 19, wherein additionally an exemplary U-shaped element belonging to the movable member and comprising blocking elements is shown in outline, wherein in FIG. 20 the blocking elements are in blocking positions and in FIG. 21 the blocking elements are in releasing positions.

Figure 1A:
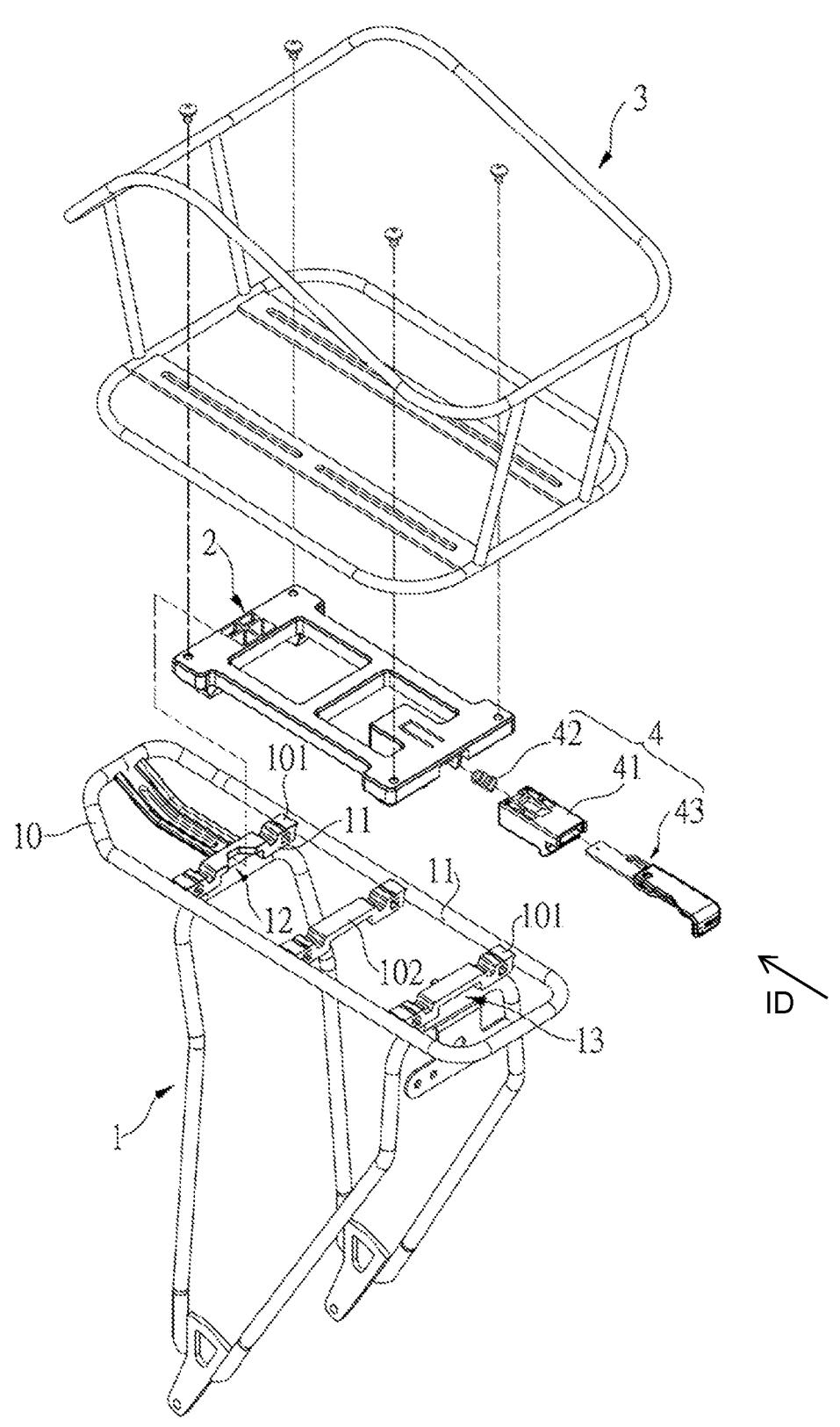
FIG. 1B shows an exploded perspective view of the locking system of FIG. 1A.
FIG. 1C shows a cross sectional side view of the bicycle rack assembly with locking system of FIGS. 1A and 1B.
Figure 1B:
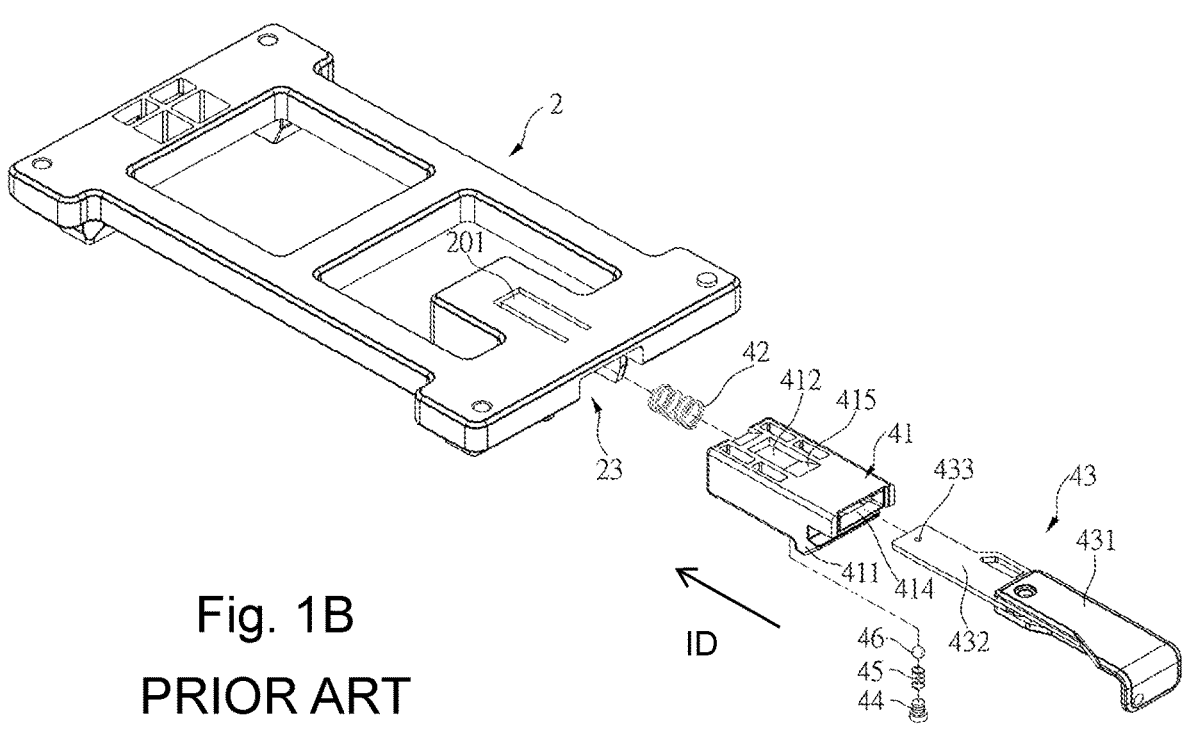
Figure 1C:
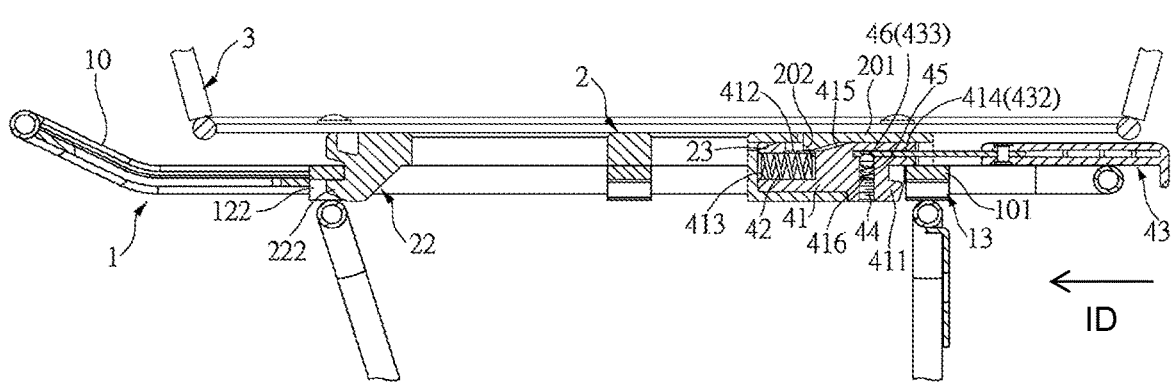

FIGS. 1A-C show a bicycle rack assembly with a locking system known from EP3351466B1. The bicycle rack assembly comprises a rack 1 as a rack-side unit and a base 2 which is mountable to the rack-side unit. The base 2 can be fixedly mounted to a receiving member 3, here a basket. The locking system comprises a locking assembly 2, 41, 42, which comprises a movable member 41 configured to be retained by the base 2. Here, a resilient rib 201 of the base 2 is configured to movably retain the movable member 41 in a side recess 23 of the base 2, in particular by engagement with an axial slot 412 of the movable member 41.

The movable member 41 comprises a base-side lock structure, here a tongue 411, which is engageable with a rack-side lock structure, here a snap recess 13, of the rack-side unit 1 for locking the base 2 to the rack-side unit 1. The movable member 41 comprises an insertion recess 414 configured for at least partly receiving an unlock unit 43 therein in an insertion direction ID for disengagement of the base-side lock structure 411 from the rack-side lock structure 13. Here, an insertion portion or unlock end 432 of the unlock unit 43 can be inserted into the insertion recess 414 while an handling portion or operation end 431 of the unlock unit 43 can be held by a user. The insertion direction ID here is opposite to a biasing direction of the movable member 41 as provided by a biasing means, here a compression spring 42 arranged between an end of the movable member 41 and a corresponding end of the side recess 23.

FIG. 1C shows the unlock unit 43 inserted in the insertion recess 414 and the movable member 41 correspondingly moved deep into the side recess 23, i.e. towards the left in the view of FIG. 1C, against a biasing action of the spring 42. Thereby, the tongue 411 is disengaged from the snap recess 13, so that the base 2 can be released from the rack 1 by first tilting the base 2 upwards, initially hinging at the connection portion 22, and subsequently removing the base 2 from the rack 1.

For remounting the base 2 to the rack 1, the connection portion 22 of the base 2 can first be hingingly engaged with the engaging recess 12, whereafter the base 2 can be tilted down to cause the tongue 411 to snap into the snap recess 13 under influence of the spring 42.

Reference is made to EP3351466B1 for further information regarding the known bicycle rack assembly with locking system as shown in FIGS. 1A-C. Where appropriate, as indicated in the above summary section, elements of the known assembly and system may be applied in embodiments of the present invention.

FIGS. 2 to 21 variously show improvements with respect to EP3351466B1, wherein reference signs with an asterisk (*) indicate elements which have been improved with respect to a corresponding element in FIGS. 1A-C. It shall be understood that other elements than those specifically indicated may be improved or otherwise be varied as well, although as one option those elements may generally be configured similar to what is shown in FIGS. 1A-C. Meanwhile, it shall be understood that elements with reference signs in the range of 50 to 99 do not have a corresponding element in the prior art assembly shown in FIGS. 1A-C.

Figures 2, 3:
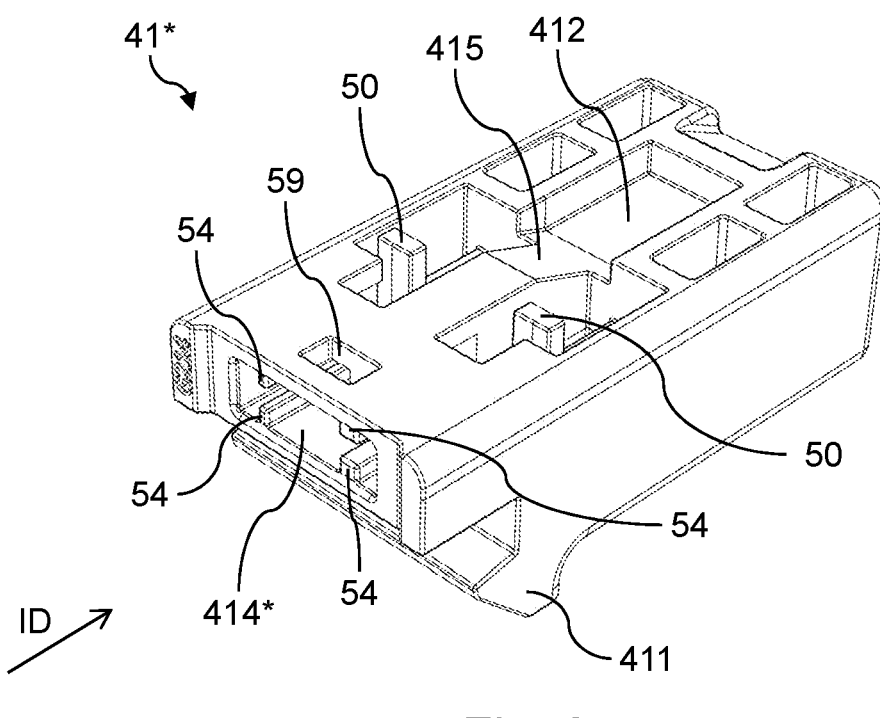
FIG. 2 shows a perspective view of an exemplary movable member.
FIG. 3 shows a perspective view of an exemplary key device.

FIG. 2 shows a movable member 41* of a locking assembly according to an embodiment of the present invention. The insertion recess 414* of the movable member 41* is configured for at least partly receiving a corresponding key device 43*, e.g. as shown in FIG. 3, therein in an insertion direction ID for disengagement of the base-side lock structure 411 from the rack-side lock structure 13. Thus, in the improved locking system, a key device 43* is provided as an improved unlock unit 43*.

Moreover, the locking assembly, in particular the movable member 41*, is provided with a security mechanism configured to inhibit disengagement of the base-side lock structure 411 from the rack-side lock structure 13 otherwise than by use of the corresponding key device 43*.

Figure 4:
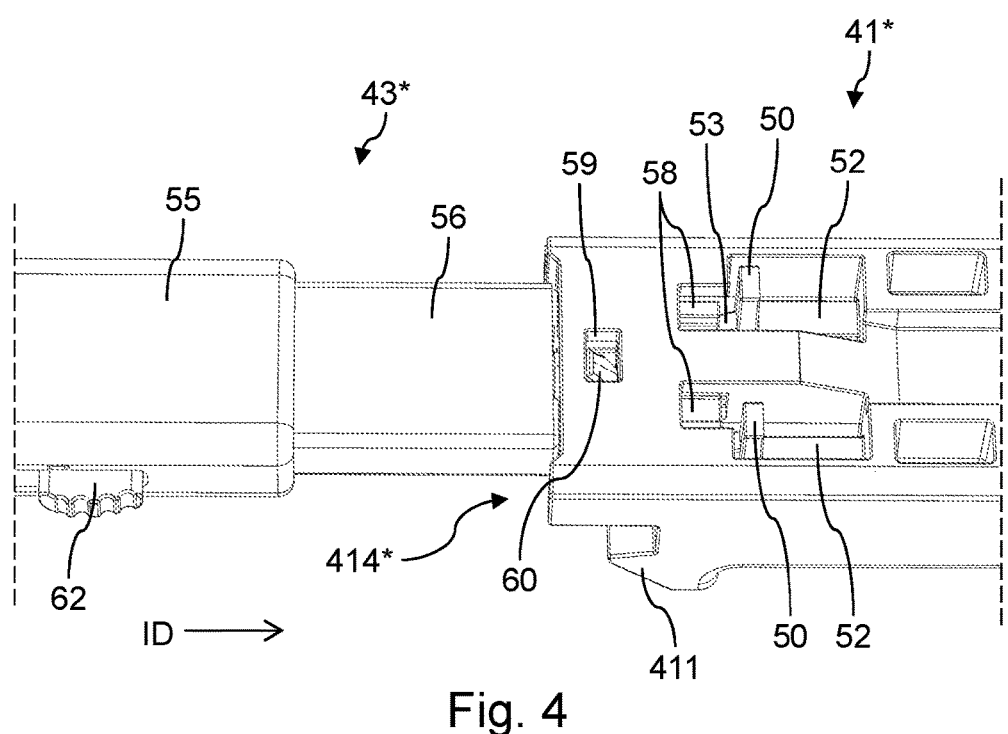
FIG. 4 shows a perspective view of an exemplary corresponding key device inserted in an insertion recess of an exemplary movable member.
Figure 5:
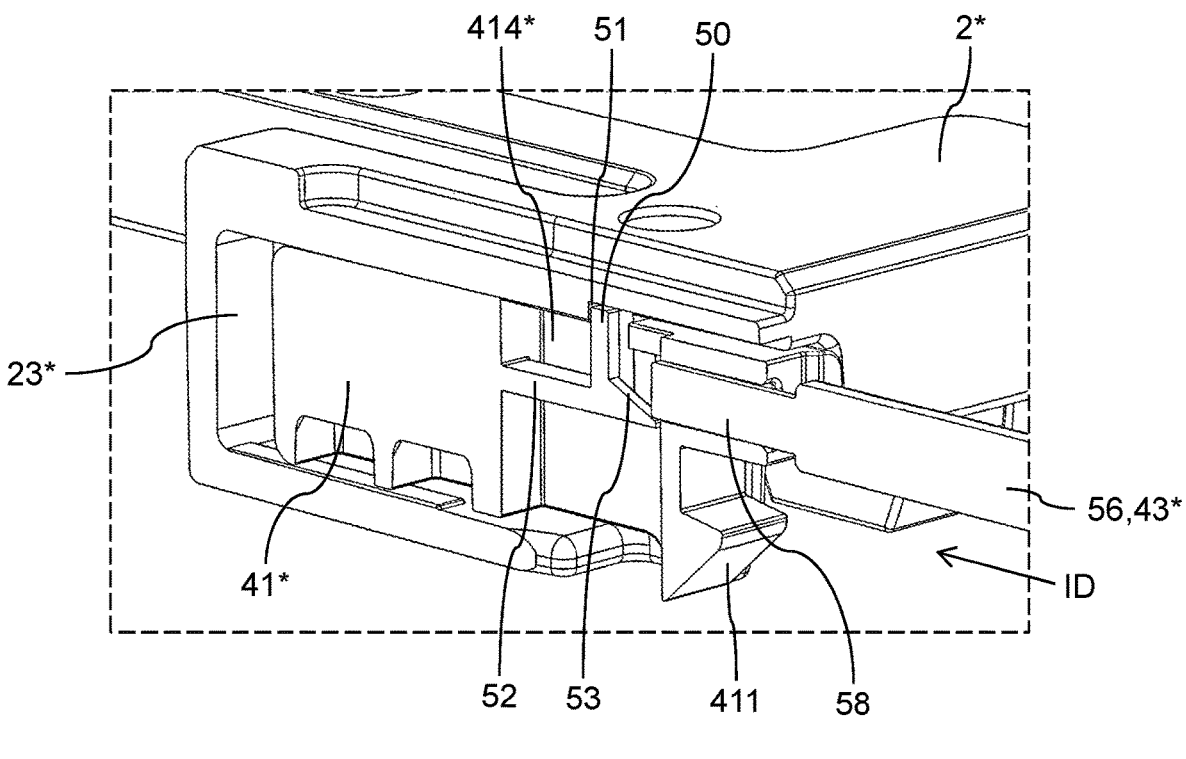
FIG. 5 shows a cross sectional perspective view of the situation of FIG. 4, wherein the movable member is shown in a side recess of an exemplary base.

As one option, shown i.a. in FIGS. 2, 4 and 5, the security mechanism may comprise at least one blocking element 50 which at least partly extends within the insertion recess 414*, so as to be movable between a blocking position and a releasing position by the key device 43* when inserted into the insertion recess 414*. In the blocking position, the blocking element 50 is configured to block a disengaging movement of the movable member 41* with respect to the base 2*, wherein in the releasing position the blocking element 50 is configured to allow said disengaging movement. The disengaging movement here is a movement of the movable member 41* deeper into the side recess 23, which, at least if the movement extends far enough, effects disengagement of the tongue 411 from the snap recess 13.

Preferably, as shown in FIGS. 2 and 4, the at least one blocking element 50 comprises at least two blocking elements 50 which are distributed across the insertion recess 414*, in particular transverse to the insertion direction ID.

FIG. 5 shows one such a blocking element 50 nearly being engaged by an inserted key device 43*. It can be seen that the blocking element 50 is still in a blocking position, in particular blocking the movable member 41* from moving deeper into the side recess 23*. Here, in the blocking position, the blocking element 50 abuts against an abutment face 51 which forms a blocking structure of the base 2*. The abutment face 51 faces outward from the side recess 23*, so that inward movement of the movable member 41* can be blocked when the blocking element 50 is in the blocking position.

To selectively allow such inward movement of the movable member 41*, the blocking element 50 can be moved to a releasing position, which in the view of FIG. 5 involves a downward movement of the blocking element 50. To enable such movement to the releasing position, the blocking element 50 is here resiliently suspended into the insertion recess 414* from a main body of the movable member 41*, in particular by a resilient arm 52 which may be integrally formed with the blocking element 51 and/or the main body of the movable member 41*. The resilient arm 52 or other resilient suspension means is preferably configured to bias the blocking element 50 into the blocking position.

The blocking element 50 is preferably configured to convert an actuation by the key device 43* in the insertion direction ID to a releasing movement of the blocking element 50, i.e. a movement from the blocking position to the releasing position. To that end, as can be seen in FIGS. 4 and 5, the blocking element 50 may comprise an inclined engagement surface 53 which is configured to convert a force exerted thereon in the insertion direction ID to a force in the direction of the releasing movement, which is downward in the view of FIG. 5.

During use, the blocking element 50 is normally in the blocking position, cooperating with the abutment face 51 to block movement of the movable member 41* deeper into the side recess 23*, thereby blocking disengagement of the tongue 411 from the snap recess 13. To selectively allow such disengagement of the tongue 411 from the snap recess 13, a suitable key device 43*, can be inserted into the insertion recess 414*, where it can reach the inclined engagement surface 53 of the blocking element 50 so that pushing the key device 43* further into the insertion recess 414* results in the blocking element 50 being moved from the blocking position to the releasing position. Then, by the same and/or a continued pushing of the key device 43*, the movable member 41* can be pushed deeper into the side recess 23* to thereby disengage the tongue 411 from the snap recess 13.

Thus, a user can conveniently operate the locking assembly to allow release of the base 2* from the rack-side unit 1 by a substantially singular continuous action of inserting the corresponding key device 43* in the insertion direction ID and then pushing the key device 43* further in the same direction. Meanwhile, the blocking by the at least one blocking element 50 advantageously makes it difficult to perform such a releasing action without a key device 43* or other means which can reach and engage the inclined engagement surface 53 of the blocking element 50.

Figure 16:
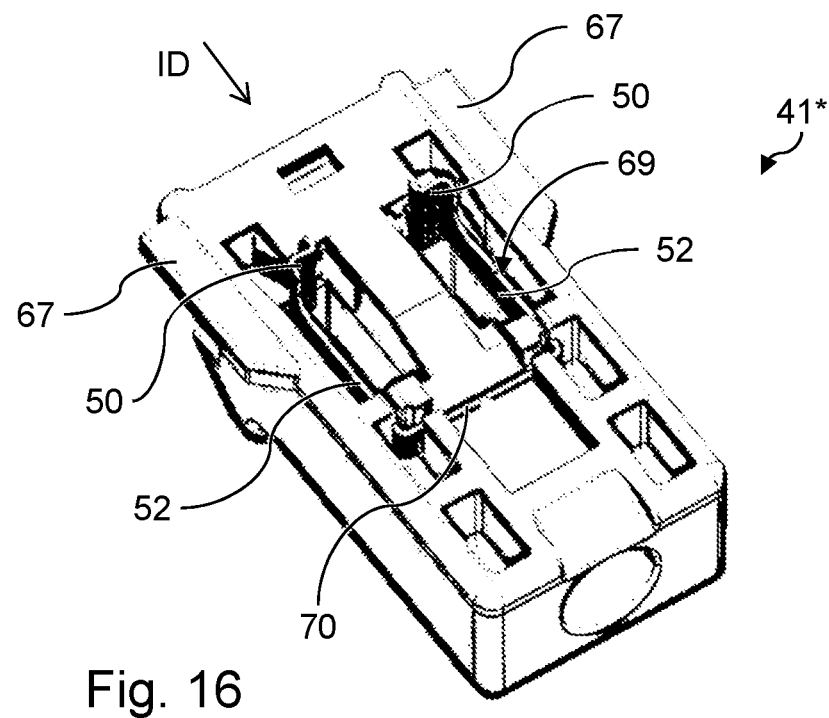
FIG. 16 shows a perspective view of a further exemplary movable member.
Figure 17:
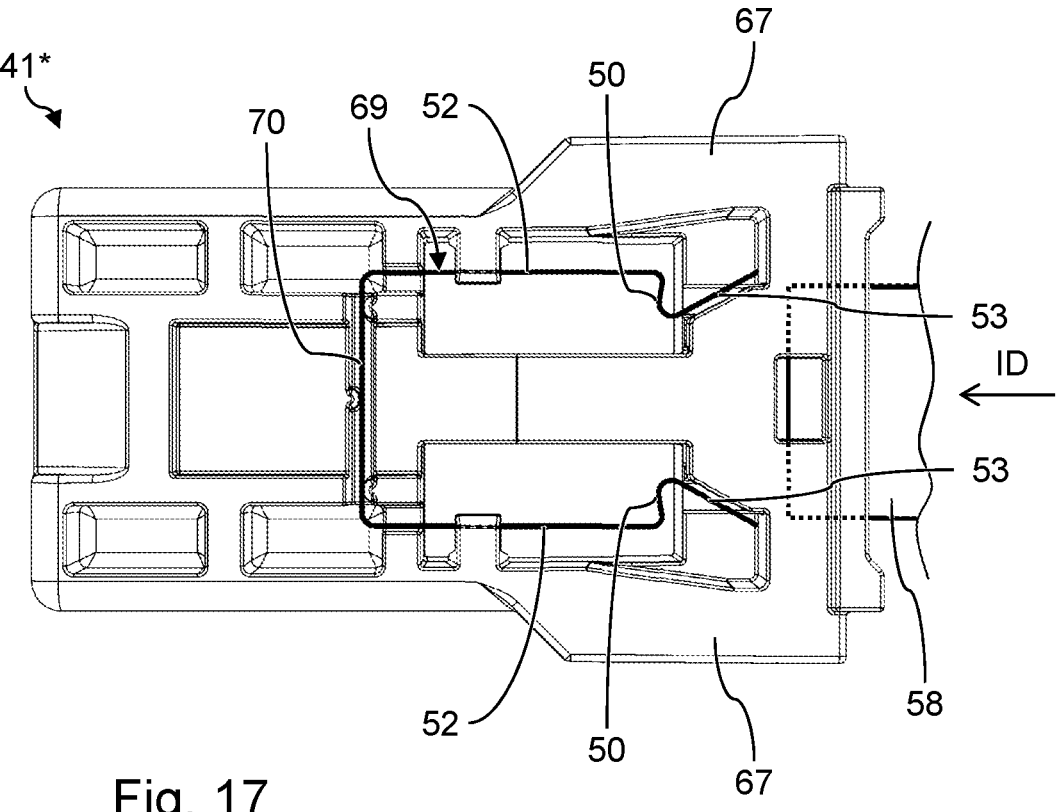
FIG. 17 shows a top view of a movable member similar to the movable member of FIG. 16.

A particularly advantageous further example of a security mechanism including an improved movable member 41* is illustrated in FIGS. 16 to 21. In FIG. 17, the insertable end 58 of the key device 43* is shown partly inserted into the movable member 41*, approaching the inclined engagement surfaces 53 here formed as integral end sections of a U-shaped spring steel element 69 which also forms the blocking elements 50, leaf springs as resilient arms 52, and an interconnecting portion 70. In this example, the blocking elements 50 can be moved from their blocking positions (shown in FIGS. 16 and 17) to their releasing positions by the insertable end 58 of the key device 43* essentially pushing the engagement surfaces 53 further apart along with their associated blocking elements 50, the pushing apart being directed transverse to the insertion direction ID thanks to the mirrored orientations of the inclined engagement surfaces 53.

The functioning of the U-shaped element 69 is further illustrated in FIGS. 20 and 21, showing only an outline of the U-shaped element 69 positioned within the side recess 23*, without showing the main body of the movable member 41*. The side recess 23* is here formed somewhat differently compared to the example of FIG. 5. In FIG. 20, the blocking elements 50 forming part of the U-shaped element 69 are in their blocking positions, abutting against abutment faces 51 (indicated in FIG. 21 but also at least partly visible in FIG. 20), which can be seen here to be relatively large compared to the example of FIG. 5. In FIG. 21, the blocking elements 50 are in their releasing positions, spaced further apart transverse to the insertion direction ID, thereby enabling the movable member 41* with the U-shaped element 69 to move further into the side recess 23* in the insertion direction ID, as can also be seen in FIG. 21.

Returning to FIGS. 16 and 17, it can be seen that the interconnecting portion 70 of the steel U-shaped element 69 can be fixedly clamped in position in a main body of the movable member 41*, said main body e.g. being made from a plastic material, wherein the fixed position of the interconnecting portion 70 can be relatively far or deep with respect to the insertion direction ID. Meanwhile the leaf springs as resilient arms 52 can extend from the interconnecting portion 70 towards end sections forming the blocking elements 50 and the inclined engagement surfaces 53. In FIG. 16, it can be seen that the blocking elements 50 extend outside an outer perimeter of the main body of the movable member 41* for selective engagement with the abutment faces 51 (shown in FIG. 21).

In the view of FIG. 17, shape details of the ends of the U-shaped element 69 can be seen to at least generally correspond to those of an Ω-shape (omega-shape), in particular with each leg having at its end a proximal mainly inwardly extending section forming the blocking element 50 and a more distal at least partly outwardly extending section forming the inclined engagement surface 53.

It shall be appreciated that corresponding features may be applied across various examples herein, apart from where it follows from the present disclosure that such examples differ from one another. Thus, for example, various features described and/or shown with reference to FIGS. 2 to 15 may be applied to the example shown in FIGS. 16 to 21, and/or vice versa.

The locking assembly, in particular the movable member, can thus be provided with a security mechanism which provides enhanced security against theft, substantially without compromising ease of use.

Additionally or alternatively, in particular for further enhancing security, the security mechanism may comprise at least one protrusion 54 which extends into the insertion recess 414*, in particular from a wall of the insertion recess 414*, transverse to the insertion direction ID, thereby restricting access into the insertion recess 414* in the insertion direction ID, in particular inhibiting access otherwise than by the corresponding key device 43*.

Preferably, when viewed in the insertion direction ID, the at least one protrusion 54 extends between the at least two blocking elements 50, in particular between respective engagement surfaces 53 thereof. In this way, the at least one protrusion 54 can inhibit simultaneous engagement of the at least two blocking elements 50 by a possible insertion of a single non-concave, e.g. planar or convex, structure, e.g. a head of a screw driver or a pen, into the insertion recess 414*.

Preferably, at least one or some of such protrusions 54 extend up to an entrance of the insertion recess 414*, while one or more other such protrusions 54 may be arranged at some distance from said entrance, for example to provide space for a retaining element 60 of the key device 43*. The retaining element 60 will be explained further elsewhere in this description.

Figures 6, 7:
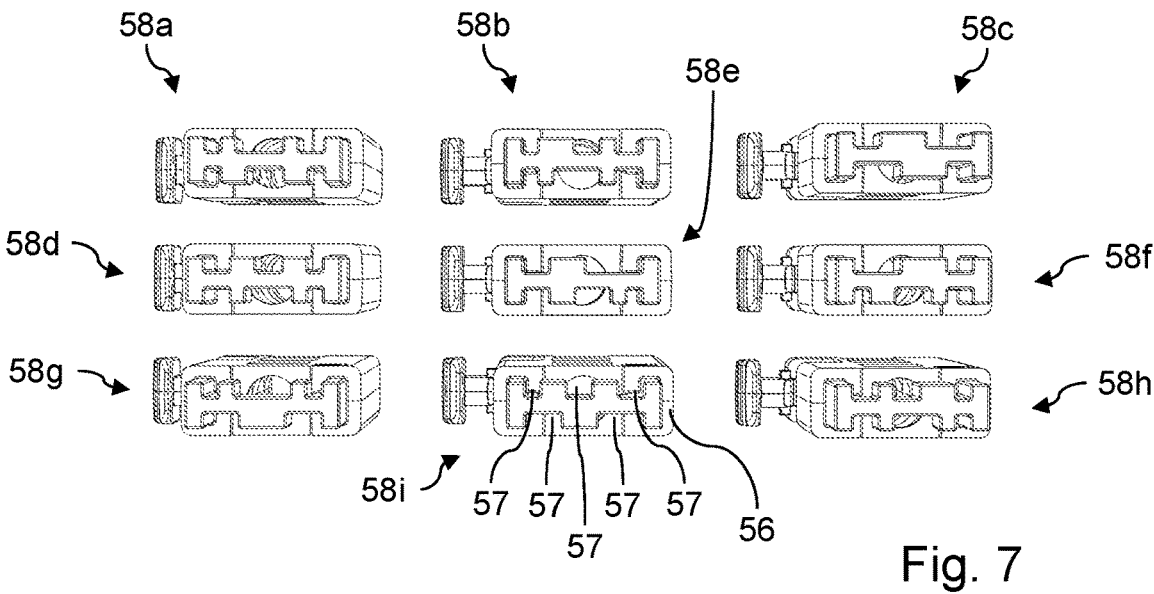
FIG. 6 shows a perspective view of a collection of nine exemplary movable members.
FIG. 7 shows a perspective view of a collection of respective second parts of nine exemplary key devices.

FIG. 6 shows a collection of nine exemplary movable members 41* each having different insertion recesses 414*a-i in the sense that the respective at least one protrusions 54 extending therein have different shapes, sizes and/or positions, thereby forming different structures which define a respective key code to be matched by a shape and/or size of a corresponding key device 43*. Otherwise, the nine movable members 41* shown in FIG. 6 are essentially the same. The blocking elements 50 and protrusions 54 have been indicated by a reference sign for only one of the nine movable members 41*, i.e. the one having insertion recess 414*i. It can be seen that the other movable members 41* have different protrusions in their insertion recesses 414*a-h.

FIG. 3 shows an exemplary key device 43* as comprising a first part 55 and a second part 56. It can be seen that recesses, here grooves, 57 are present in the second part 56, in particular at an insertable end 58 thereof which is configured to be inserted into the insertion recess 414*. The recesses 57 of the key device 43* may correspond to, i.e. at least be configured to accommodate, the protrusions 54 of the insertion recess 414*, so that the key device 43*, at least the respective insertable end 58 thereof, is insertable in the insertion recess 414* of a corresponding movable member 41* in the insertion direction ID. In particular, the insertable end 58 is thus insertable so far into the insertion recess 414* as to be able to reach the inclined engagement surfaces 53 of the blocking elements 50, thus to be able to move the blocking elements 50 to their releasing positions to allow the movable member 41* to be pushed deeper into the side recess 23* for disengagement of the tongue 411 from the snap recess 13.

FIG. 7 shows a collection of nine of such second parts 56 of key devices 43* each having different insertable ends 58a-i in the sense that their recesses 57 have different shapes, sizes and/or positions to match, or at least accommodate, protrusions 54 of a corresponding movable member 41*. As an example, recesses 57 of one 58i of the insertable ends 58a-i have been indicated by reference signs 57 in FIG.

7, while such recesses 57 can be seen to be present with different shapes, sizes and/or positions in the other shown insertable ends 58*a-h*.

It shall be understood that optionally a same key device 43* may correspond to, i.e. be suitable to operate, multiple different movable members 41* having different protrusions 54. It shall also be understood that optionally a same movable member 41* may correspond to, i.e. be operable by, multiple different key devices 43* having different recesses 57.

While the insertion recess 414* has been described herein as having protrusions 54 and the insertable end 58 has been described as having recesses 57, it shall be understood that alternatively or additionally the shown insertion recesses 414* can be regarded as comprising keycode defining recesses, in particular between its protrusions 54, while the insertable end 58 comprises corresponding keycode defining protrusions, in particular between its recesses 57.

Importantly, the shape and/or size of the insertable end 58 of the key device 43* is such that it can engage the engagement surfaces 53 of the blocking elements 50. Thus, at a position corresponding to said engagement surfaces 53, the insertable end 58 generally has a male structure as opposed to e.g. a recess 57.

Figure 8:
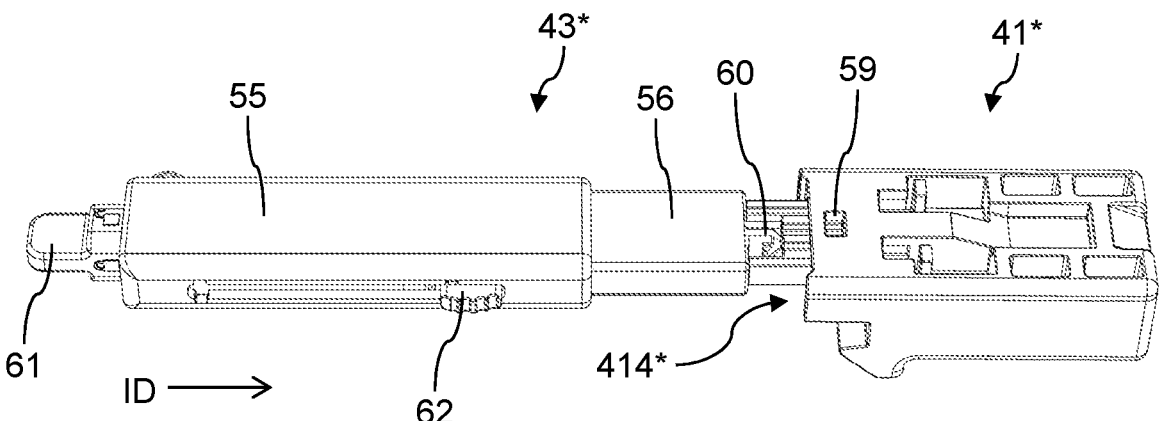
FIG. 8 shows a perspective view of an exemplary corresponding key device being partially retracted from an insertion recess of an exemplary movable member.

With reference to FIGS. 2, 4 and 8, the insertion recess 414* may comprise a retaining structure 59 which is configured to be engaged by a retaining element 60 of the key device 43* for selectively retaining the key device 43* in the insertion recess 414*. The retaining element 60 may be movable, e.g. rotatable, between a retaining position, e.g. as shown in FIG. 4, and a releasing position, e.g. as shown in FIGS. 3 and 8. In the retaining position, the retaining element 60 is configured to engage the retaining structure 59 of the insertion recess 414* for thereby retaining the key device 43* in the insertion recess 414*. In the releasing position, the retaining element 60 is configured to allow release of the key device 43* from the insertion recess 414*.

In the shown examples, the retaining element 60 comprises a hook which can extend into the insertion recess 414*, wherein the retaining structure comprises a retaining recess 59 formed on a side of the insertion recess 414* for retaining the hook 60 therein. The hook as retaining element 60 is here suspended from a main body 55 and/or 56 of the key device 43* in a resilient way so as to be biased into the retaining recess 59. The hook 60 is provided with an inclined face so as to be deflected upon insertion of the key device 43* into the insertion recess 414* by a side of the insertion recess 414*. The normal position of the retaining element 60 is automatically restored by the aforementioned biasing upon engagement of the retaining recess 59. To disengage the retaining element 60 from the retaining recess 59, the user may rotate the retaining element 60 from the retaining position to the releasing position about a rotation axis substantially parallel to the insertion direction ID, for example by about 90 degrees. To that end, the key device 43* comprises a handle 61 coupled to the retaining element 60 for manually moving the retaining element 60 between the retaining position and the releasing position, in particular while the key device 43* is received in the insertion recess 414*.

The same handle 61 can be used to return the retaining element 60 to the retaining position from the releasing position. Alternatively or additionally, the retaining element 60 may be biased towards the retaining position. In that case, the user may at least briefly hold the retaining element 60 in the retaining position using the handle 61 while retracting the key device 43* from the insertion recess 414*.

Figure 10:
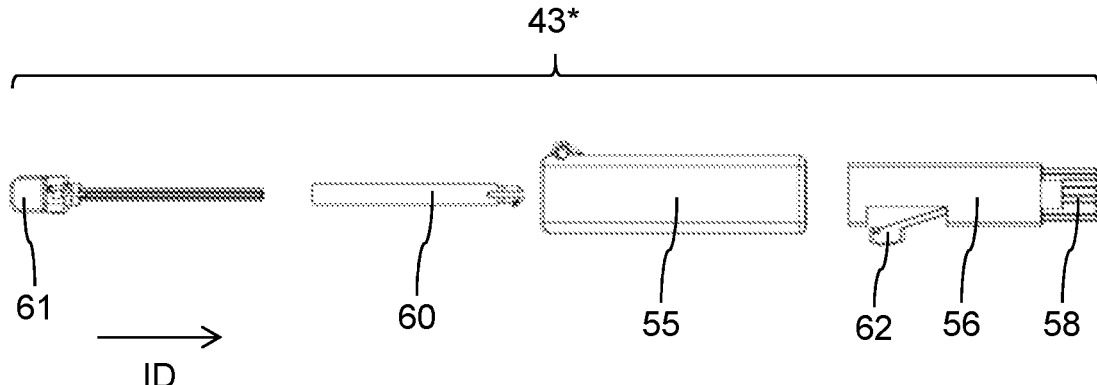
FIG. 10 shows an exploded top view of an exemplary key device.

FIGS. 3 and 10 show how the handle 61 and the retaining element 60 can extend through the key device 43* while being coupled through a resilient shaft which is formed by the handle 61 and the retaining element 60 together.

Figure 9:
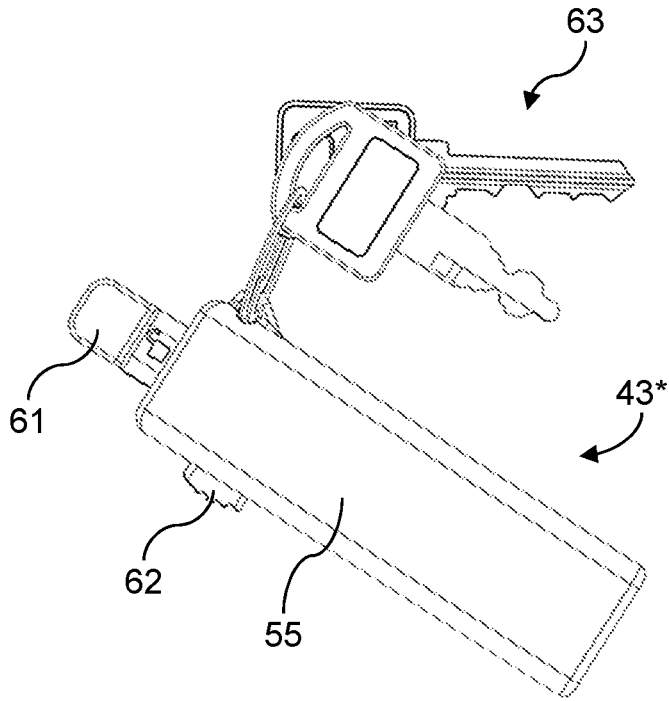
FIG. 9 shows a top view of an exemplary key device in a transport configuration together with further keys.

The key device 43* may be changeable between an operational configuration, e.g. as shown in FIGS. 3 to 5 and 8, in which the key device 43* is configured to operate the security mechanism, and a transport configuration, e.g. as shown in FIG. 9, in which the key device 43* is more compact compared to the operational configuration. To that end, the second part 56 may be slideably retractable into the first part 55, in particular by manipulation of a knob 62 or similar operating element. As shown in FIG. 9, in the transport configuration, the key device 43* can conveniently be kept together with one or more further keys 63, such as a key for a bicycle lock, a key for a battery lock, or a house key.

The key device 43*, for example the knob 62, is preferably configured to selectively retain the selected one of the operational configuration and the transport configuration in the absence of manipulation of the knob 62 or other deliberate user action, so that the key device 43* normally remains in a selected configuration unless the user chooses to change the configuration. FIG. 10 shows how the knob 62 can be resiliently suspended from a main body of the second part 56 of the key device 43* to provide e.g. a resistance or clamping of the second part 56 with respect to the first part 55, which can be overcome by a user pushing the knob 62 who can then slide the second part 56 into or out of the first part 55, wherein the same knob 62 then conveniently provides a grip for the user.

Figure 11:
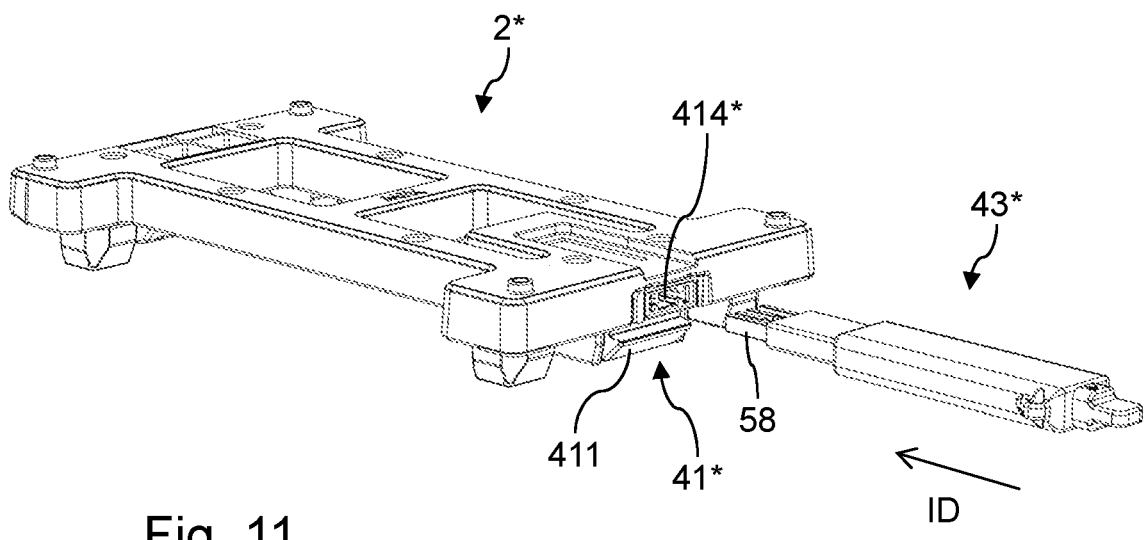
FIG. 11 shows a perspective view of an exemplary locking system.

FIG. 11 shows an overview of an exemplary improved locking assembly and locking system. Herein, the rack-side unit 1 can be the same or similar compared to the prior art rack 1. Alternatively, for example, an add-on unit can be provided as a rack-side unit, the add-on unit comprising i.a. the snap recess and being fixable to a bicycle rack which may itself not have such a snap recess. By comparison to FIGS. 1A-C, it can be seen that the exemplary assembly and system of FIG. 11 is provided with a security mechanism which advantageously provides enhanced theft protection while being at least as easy to use as the prior art system.

Figure 12:
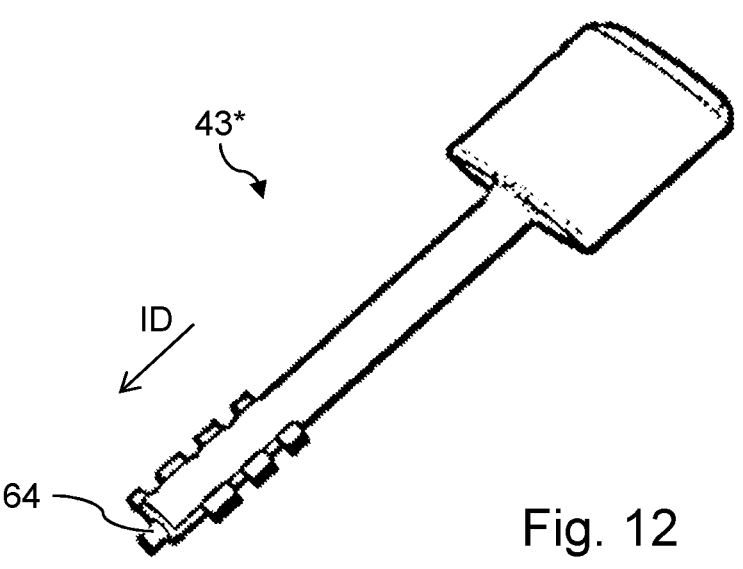
FIG. 12 shows a perspective view of a further exemplary key device.
Figure 13:
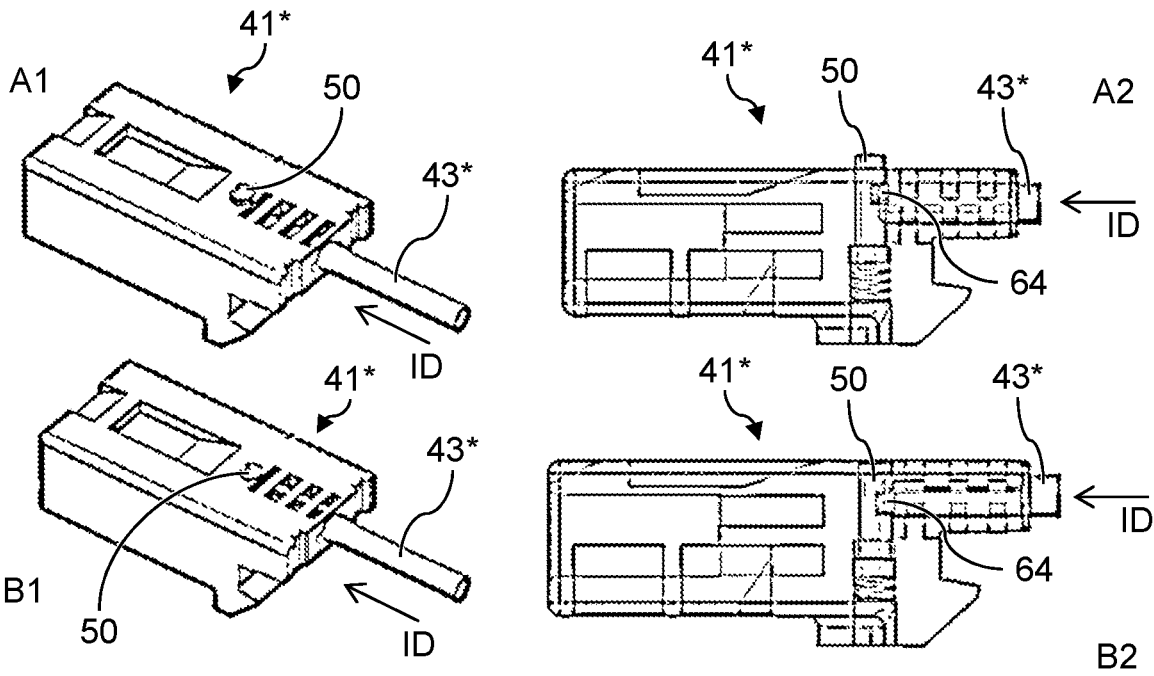
FIG. 13 shows four views of an exemplary movable member with part of the key device of FIG. 12 inserted therein.

A further alternative or additional option is shown in FIGS. 12 and 13. In this example, the at least one blocking element 50 is operable by an eccentric cam 64 which extends from an insertion end of the key device 43*, wherein the inserted key device 43* is rotatable in the insertion recess about a central rotation axis substantially parallel to the insertion direction ID in dependence of a key code structure of the key device 43*. Here the key code structure is formed by series of teeth distributed along the insertion direction ID and having particular positions, sizes and/or shapes, matching a corresponding key code structure of the insertion recess, e.g. correspondingly positioned, sized and/or shaped recesses in a wall of the insertion recess which are configured to allow passage of the aforementioned teeth therethrough when the key device 43* is rotated in the insertion recess. FIG. 13 shows a correspondingly configured movable member 41* with a partly shown key device 43* inserted therein, the same key device 43* being shown in full in FIG. 12. FIG. 13 shows four different views, indicated as A1, A2, B1 and B2. A1 and B1 are perspective views, while A2 and B2 are partly transparent side views. In A1 and A2, the blocking element 50 is in a blocking position, in which position it extends outside an outer face of the movable member 41* to engage a corresponding blocking structure of the base. In B1 and B2, the blocking element 50 is in a releasing position. In A2 and B2 it can be seen that the eccentric cam 64 can be positioned at different heights by rotation of the key device 43* to move the blocking element 50 between the blocking position and the releasing position. Here the blocking element 50 is biased towards the blocking position by a biasing spring, so that the blocking element 50 is normally in the blocking position.

Figure 14:
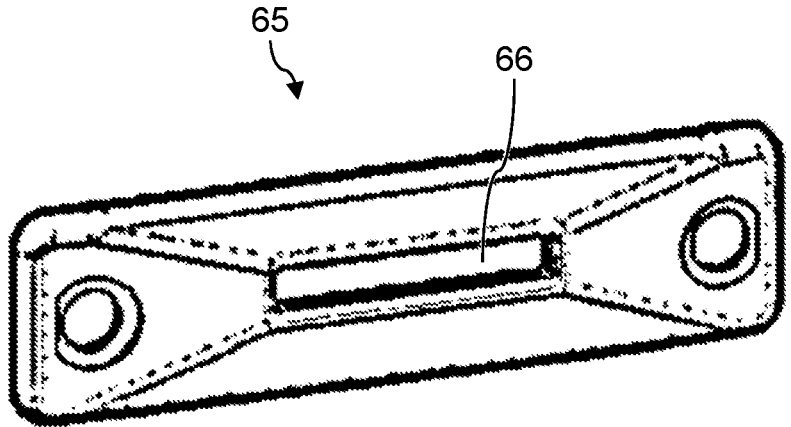
FIG. 14 shows a perspective view of an exemplary shield.
Figure 15:
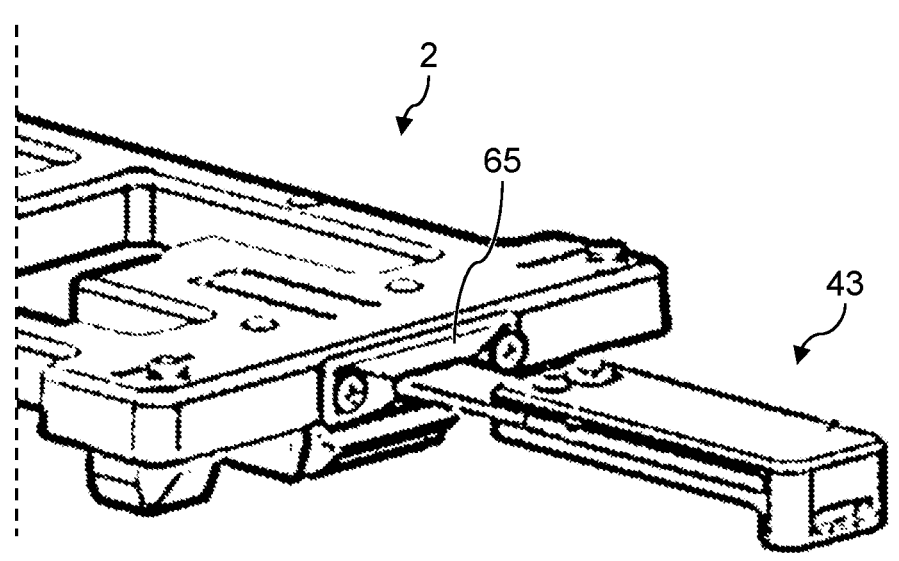
FIG. 15 shows a perspective view of the shield of FIG. 14 mounted to a base.

As shown in FIGS. 14 and 15, the security mechanism of the movable member may alternatively or additionally comprise a shield 65 arranged on the base 2 to at least partly cover an outward facing side of the movable member. In this example, the shield 65 has an opening 66 therein which substantially matches an entrance of the insertion recess of the movable member. Such a shield 65 advantageously inhibits actuation of the movable member by a means which cannot be inserted into the insertion recess, e.g. a finger or a relatively thick instrument. Here the opening 66 is in the form of a slit, thus being relatively restricted. Such a shield 65 provides a relatively simple way of enhancing security and can for example be applied relatively easily to existing bicycle rack assemblies, for example by screwing or gluing such a shield to the base 2 of the existing bicycle rack assembly. As shown in FIG. 15, a same or similar unlock unit 43 as shown in FIGS. 1A-C may then be used. Nevertheless, a similar shield or cover may also be applied in combination with a key device 43* as shown in FIG. 2 and further.

As shown in FIGS. 16 to 19, to help reduce undesired play between the movable member 43* and the side recess 23*, the movable member 43* may be provided with one or more winglets 67 extending laterally outwardly and along the insertion direction ID, wherein the side recess 23* may be provided with corresponding tracks 68 in which the winglets 67 can slide along the insertion direction ID while movements in other directions are substantially constrained by a relatively close mating between the winglets 67 and the tracks 68.

While the invention has been explained herein using exemplary embodiments and drawings, these do not limit the scope of the invention as defined by the appended claims. For the purpose of clarity and a concise description features are described herein as part of the same or separate embodiments, however, it will be appreciated that the scope of the invention may include embodiments having combinations of all or some of the features described. Many variations and extensions are possible, as will be understood by the skilled person. For example, the security mechanism may additionally or alternatively comprise one or more of: an electronic security mechanism, a magnetic security mechanism, and a cylinder lock.

Engagement between the movable member and the rack-side unit may additionally or alternatively be realized by a male part of the rack-side unit and a female part of the movable member. Further examples have been provided throughout the description. Many variants are possible, which fall within the scope of the invention as defined by the following claims.

LIST OF REFERENCE SIGNS

1. Rack
2, 2*. Base
3. Receiving member
4. Positioning assembly
10. Frame
11. Lateral portion
12. Engaging recess
13. Snap recess
22. Connection portion
23, 23*. Side recess
41,41*. Movable member
42. Spring
43. Unlock unit
43*. Key device
44. Screw
45. Resilient member
46. Ball
50. Blocking element
51. Abutment face
52. Resilient arm
53. Inclined engagement surface
54. Protrusion of insertion recess
55. First part of key device
56. Second part of key device
57. Recess of key device
58. Insertable end of key device
59. Retaining structure
60. Retaining element
61. Handle
62. Knob
63. Further keys
64. Eccentric cam
65. Shield
66. Opening in shield
67. Winglet
68. Track
69. U-shaped spring steel element
70. Interconnecting portion
101. Bar
102. Middle bar
122. Wide area
201. Resilient rib
202. Guide member
222. Second part
411. Tongue
412. Axial slot
413. End recess
414, 414*. Insertion recess
415. Inclined face
416. Receiving recess
431. Operation end
432. Unlock end
433. Positioning hole
ID. Insertion direction

The invention claimed is:

1. A locking assembly for a bicycle rack assembly which comprises a rack-side unit and a base which is mountable to the rack-side unit, the locking assembly comprising a movable member configured to be retained by the base, the movable member comprising a base-side lock structure which is engageable with a rack-side lock structure of the rack-side unit for locking the base to the rack-side unit, wherein the movable member comprises an insertion recess configured for at least partly receiving a corresponding key device therein in an insertion direction for disengagement of the base-side lock structure from the rack-side lock structure, wherein the locking assembly is provided with a security mechanism configured to inhibit disengagement of the base-side lock structure from the rack-side lock structure otherwise than by use of the corresponding key device, wherein the security mechanism comprises at least one blocking element which is resiliently suspended into the insertion recess from a main body of the movable member so as to be movable between a blocking position and a releasing position by the key device when inserted into the insertion recess, wherein in the blocking position the at least one blocking element is configured to block a disengaging movement of the movable member with respect to the base associated with disengagement of the base-side lock structure from the rack-side lock structure, wherein in the releasing position the at least one blocking element is configured to allow said disengaging movement, and wherein the blocking element is configured to convert an actuation by the key device in the insertion direction to a movement of the blocking element from the blocking position to the releasing position.

2. The locking assembly according to claim 1, wherein the at least one blocking element comprises at least two blocking elements which are distributed across the insertion recess, in particular transverse to the insertion direction.

3. The locking assembly according to claim 2, wherein the at least two blocking elements are interconnected at one or more positions along the insertion direction beyond where the key device extends when inserted into the insertion recess, in particular only at such one or more positions.

4. The locking assembly according to claim 2, wherein the at least two blocking elements are each provided with a respective resilient arm formed as a leaf spring configured to provide the movability between the blocking position and the releasing position.

5. The locking assembly according to claim 4, wherein the leaf springs are each part of a same metal element which further comprises an interconnecting portion providing the interconnection of the at least two blocking elements.

6. The locking assembly according to claim 2, wherein the at least two blocking elements are spaced further apart in their releasing positions than in their blocking positions, in particular spaced further apart transverse to the insertion direction.

7. The locking assembly according to claim 6, wherein the metal element is substantially U-shaped, in particular with the leaf springs as legs of the U-shape each extending from the interconnecting portion towards respective ones of the blocking elements at their distal ends.

8. The locking assembly according to claim 1, wherein the security mechanism comprises at least one protrusion which extends into the insertion recess transverse to the insertion direction, thereby restricting access into the insertion recess in the insertion direction, in particular inhibiting access otherwise than by the corresponding key device.

9. The locking assembly according to claim 8, wherein, when viewed in the insertion direction, the at least one protrusion extends between the at least two blocking elements, in particular so as to inhibit simultaneous engagement of the at least two blocking elements by insertion of a single non-concave structure into the insertion recess.

10. The locking assembly according to claim 1, wherein the insertion recess comprises a retaining structure which is configured to be engaged by a retaining element of the key device for selectively retaining the key device in the insertion recess.

11. A combination of a locking assembly for a bicycle rack assembly which comprises a rack-side unit and a base which is mountable to the rack-side unit, the locking assembly comprising a movable member configured to be retained by the base, the movable member comprising a base-side lock structure which is engageable with a rack-side lock structure of the rack-side unit for locking the base to the rack-side unit, wherein the movable member comprises an insertion recess configured for at least partly receiving a corresponding key device therein in an insertion direction for disengagement of the base-side lock structure from the rack-side lock structure, wherein the locking assembly is provided with a security mechanism configured to inhibit disengagement of the base-side lock structure from the rack-side lock structure otherwise than by use of the corresponding key device and the base, wherein the movable member is retained by the base, wherein the security mechanism comprises at least one blocking element which at least partly extends within the insertion recess so as to be movable between a blocking position and a releasing position by the key device when inserted into the insertion recess, wherein the base comprises at least one blocking structure which is configured to be engaged by the at least one blocking element in the blocking position for blocking the disengaging movement of the movable member with respect to the base.

12. A locking system for a bicycle rack assembly which comprises a rack-side unit and a base which is mountable to the rack-side unit, the locking system comprising: a locking assembly, the locking assembly comprising a movable member configured to be retained by the base, the movable member comprising a base-side lock structure which is engageable with a rack-side lock structure of the rack-side unit for locking the base to the rack-side unit, wherein the movable member comprises an insertion recess configured for at least partly receiving a corresponding key device therein in an insertion direction for disengagement of the base-side lock structure from the rack-side lock structure, wherein the locking assembly is provided with a security mechanism configured to inhibit disengagement of the base-side lock structure from the rack-side lock structure otherwise than by use of the corresponding key device, wherein the locking system further comprises the corresponding key device, wherein the security mechanism comprises at least one blocking element which is resiliently suspended into the insertion recess from a main body of the movable member so as to be movable between a blocking position and a releasing position by the key device when inserted into the insertion recess, wherein in the blocking position the at least one blocking element is configured to block a disengaging movement of the movable member with respect to the base associated with disengagement of the base-side lock structure from the rack-side lock structure, wherein in the releasing position the at least one blocking element is configured to allow said disengaging movement, and wherein the blocking element is configured to convert an actuation by the key device in the insertion direction to a movement of the blocking element from the blocking position to the releasing position.

13. The locking system according to claim 12, wherein the key device comprises a retaining element which is movable between a retaining position and a releasing position, wherein in the retaining position the retaining element is configured to engage a retaining structure of the insertion recess for thereby retaining the key device in the insertion recess, wherein in the releasing position the retaining element is configured to allow release of the key device from the insertion recess.

14. The locking system according to claim 13, wherein the key device comprises a handle coupled to the retaining element for manually moving the retaining element between the retaining position and the releasing position, in particular while the key device is received in the insertion recess.

15. The locking system according to claim 12, wherein the key device is changeable between an operational configuration, in which the key device is configured to operate the security mechanism, and a transport configuration, in which the key device is more compact compared to the operational configuration.

16. The locking system according to claim 12 in combination with the base, wherein the movable member is retained by the base.

17. The locking system according to claim 16, wherein the security mechanism comprises at least one blocking element which at least partly extends within the insertion recess so as to be movable between a blocking position and a releasing position by the key device when inserted into the insertion recess, and wherein the base comprises at least one blocking structure which is configured to be engaged by the at least one blocking element in the blocking position for blocking the disengaging movement of the movable member with respect to the base.

18. A bicycle rack assembly comprising a rack-side unit, a base which is mountable to the rack-side unit, and a locking assembly, the locking assembly comprising a movable member configured to be retained by the base, the movable member comprising a base-side lock structure which is engageable with a rack-side lock structure of the rack-side unit for locking the base to the rack-side unit, wherein the movable member comprises an insertion recess configured for at least partly receiving a corresponding key device therein in an insertion direction for disengagement of the base-side lock structure from the rack-side lock structure, wherein the locking assembly is provided with a security mechanism configured to inhibit disengagement of the base-side lock structure from the rack-side lock structure otherwise than by use of the corresponding key device, wherein the bicycle rack assembly comprises the corresponding key device, wherein the security mechanism comprises at least one blocking element which is resiliently suspended into the insertion recess from a main body of the movable member so as to be movable between a blocking position and a releasing position by the key device when inserted into the insertion recess, wherein in the blocking position the at least one blocking element is configured to block a disengaging movement of the movable member with respect to the base associated with disengagement of the base-side lock structure from the rack-side lock structure, wherein in the releasing position the at least one blocking element is configured to allow said disengaging movement, and wherein the blocking element is configured to convert an actuation by the key device in the insertion direction to a movement of the blocking element from the blocking position to the releasing position.

* * * * *